O. P. WERNER AND T. W. ARNTZ.
BEATER.
APPLICATION FILED AUG. 11, 1920.
1,375,338.
Patented Apr. 19, 1921.
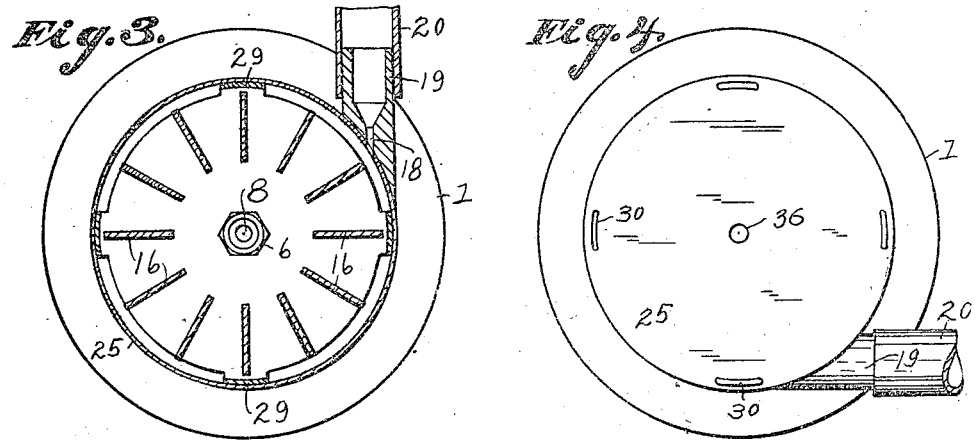
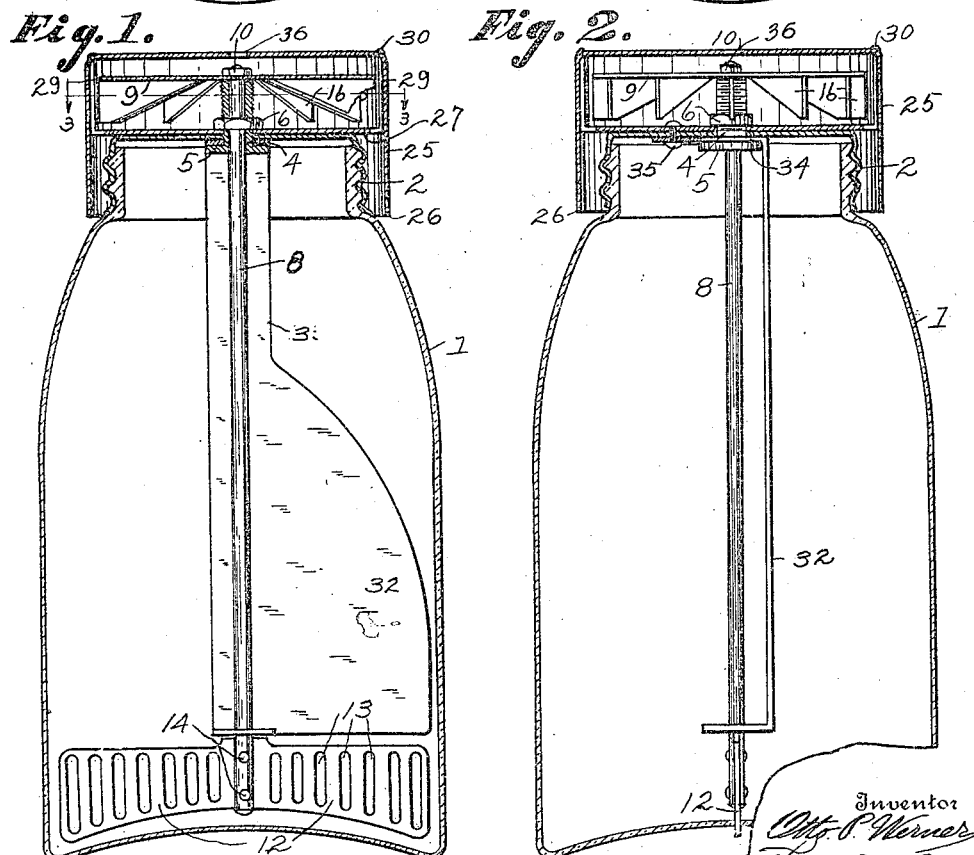

UNITED STATES PATENT OFFICE.

OTTO P. WERNER AND THEODORE W. ARNTZ, OF MILWAUKEE, WISCONSIN.

BEATER.

1,375,338.

Specification of Letters Patent. Patented Apr. 19, 1921.

Application filed August 11, 1920. Serial No. 402,933.

*To all whom it may concern:*

Be it known that we, OTTO P. WERNER and THEODORE WM. ARNTZ, citizens of the United States, residing at Milwaukee, county of Milwaukee, and State of Wisconsin, have invented new and useful Improvements in Beaters, of which the following is a specification.

Our invention relates to improvements in beaters adapted for use as cream whippers, and for analogous beating operations.

The object of our invention is to provide a motor actuated beater, in combination with the cover of the receptacle which contains the material to be whipped or violently agitated, the mechanism being of such form and attached to the cover in such a manner that it may move into and out of the receptacle during the operation of attaching or detaching the cap or cover.

A further object of our invention is to provide means whereby the beater may be driven by a water motor, the outlet of which is so disposed as to distribute the water from the motor over the sides of the receptacle containing the material to be whipped or beaten, whereby such material may be cooled or kept from rising in temperature during the beating operation.

A further object of our invention is to provide a simple, inexpensive, sanitary and highly efficient beating apparatus, adapted to be used as an attachment for any ordinary fruit jar of standard dimensions.

In the drawings:—

Figure 1 is a vertical sectional view of a fruit jar having a cap of standard type with our improved apparatus attached thereto in position for use, the shaft bearing being shown in section and the baffle, together with the beater and its shaft, being shown in full.

Fig. 2 is a view of the same taken at right angles to Fig. 1, and also showing the shaft bearing in full.

Fig. 3 is a sectional view, drawn on line 3—3 of Fig. 1.

Fig. 4 is a plan view of the motor casing.

Like parts are identified by the same reference characters throughout the several views.

The jar 1 may be assumed to be a standard fruit jar, having a cap 2 of ordinary type, except as hereinafter described.

The cap 2 is centrally apertured, and provided with a shaft bushing 4 having at its lower end an outwardly projecting annular clamping flange 5, and having its upper end portion threaded to receive the clamping nut 6, whereby the bushing may be secured in position and clamped to the cap 2. A shaft 8 has a reduced upper end which passes through a disk 9 to which it is clamped by a nut 10. The lower end of the shaft is provided with the whipper or beater wing 12 having a series of slots or apertures 13 therein, which preferably extend vertically. The lower margin of the wing 12 is preferably curved in conformity with the curvature of the bottom of the jar. The shaft is preferably split, and one margin of the wing inserted between the halves and secured thereto by rivets 14. It may also be brazed, soldered, or welded to the shaft if desired. The disk 9 has a bearing upon the upper end of the bushing 4, whereby the shaft 8 is supported with the beater wing 12 in close proximity thereto, but out of contact with the bottom of the jar.

The disk 9 also forms part of a water actuated motor, this disk being provided with a series of downwardly extending blades 16 located in planes radial to the shaft, and the lower margins of which preferably extend downwardly and outwardly as shown, whereby each of the blades has a generally triangular form, and has wide outer portions to receive the impact of a jet of water discharged through a nozzle 18 tangentially to the circle described by the wide outer portions of the blades when the disk 9 with its blades 16 is revolved. The nozzle 18 is provided with a coupling 19 to receive a water supply pipe 20, preferably a flexible hose adapted to be adjusted to any faucet of the standard size ordinarily employed to supply water to a kitchen sink.

A motor casing 25 preferably has the form of an inverted cup, the diameter of which is sufficient to receive the motor within it, i. e., the casing is slightly larger in diameter than the diameter of the disk 9. A supporting bracket 27 is mounted on the top of the jar cap 2, to which it is clamped by the nut 6. This bracket has upturned arms 29 which are secured to the casing in any suitable manner, preferably by passing these arms through apertures in the cap, and folding or expanding the ends to rivet or clench them through the cap as shown at 30 in Figs. 1 and 4. The bushing 4 extends through an aperture in the bracket 27, the central portion of the latter being disk shaped throughout an area substantially equal to the diameter of the cap 2. The motor casing is, of course, supported from the cap by the bracket, whereas the motor itself is supported from the upper end of the bushing 4, as above stated. The lower margin 26 of the motor casing 25 is supported in proximity to the spherically convex surface of the jar below the threaded portion of the mouth piece which is engaged by the correspondingly threaded flange of the cap 2, and the water from the motor is delivered downwardly between the arms 29 of the bracket 27, and directed by the motor casing over the surfaces of the jar on all sides thereof, whereby the jar and its contents are kept at substantially the same temperature as that of the water used for driving the motor without any additional expenditure of water for refrigerating purposes.

It is obvious that a cap, such as the cap 2 above described, may be equipped with our improved motor and whipping or beating mechanism, and may be readily applied to the mouth of any ordinary fruit jar to which the cap 2 may be screwed, whereupon the beating or whipping mechanism may be supported in position for operation near the bottom of the jar. Thereupon the tube or duct 20 may be connected with any ordinary source of water supply under pressure, and the jet delivered through the nozzle 18 will drive the motor and operate the beater.

We preferably connect a baffle 32 with the under side of the cap 2, whereby this baffle may be supported in a relatively stationary position within the jar. The baffle may be composed of a sheet of sheet metal having an upwardly projecting narrower portion 33 which serves as a shank. The upper end of the shank 33 is elbowed to provide a horizontally extending portion 34 through which the shaft 8 and also the bushing 4 passes, whereby the horizontal extremity of the shank may be interposed between the bushing flange 5 and the cap 2 to which it is clamped by the bushing when the nut 6 is turned up. A rivet 35 may also be employed to anchor the shank to the cap against possible rotation if the clamping pressure should be insufficient. Near the lower end of the baffle, the plate of which it is composed is preferably provided with a flange 36 through which the shaft 8 passes. This provides a bearing for the shaft in the vicinity of the beating wing 12, and prevents lateral vibration.

It will, of course, be understood that any desired number of beater wings such as the wing 12 may be secured to the lower end of the shaft. Two wings projecting in opposite directions to balance the pressure are preferred.

It is to be noted that by providing the elongated baffle 32 the whipped fluffy material is stripped from the revolving liquid and is caused to rise and fill the upper portion of the jar. This particular type of baffle maintains the entire mass of light whipped material in a stationary condition and prevents movement thereof, which might result in breaking of the multitude of air cells formed therein. This is a very necessary function in whipping cream, for instance, or other materials. An equally desirable result is accomplished by the cooling of this fluffy whipped material while it is held in a stationary position. The cooling, of course, is effected by causing the waste water to discharge around the outer portion of the jar and to maintain the whipped material in a constant chilled condition.

We claim:—

1. A beater comprising a cap having a fitting for operatively attaching said cap to a faucet, a jar adapted to be closed by said cap, a water motor carried by said cap and having a driving shaft extending into said jar, a whipper carried by said shaft adjacent the lower portion of said jar, and a baffle carried by said cap and extending from adjacent the upper side of said whipper a material distance upwardly toward the top of said jar and presenting a wide surface to allow the whipped material to build up wardly into the upper portion of said jar while preventing rotation of said whipped material, said motor being so positioned as to discharge waste water over the outer surface of said jar to maintain both the material being operated upon and the lighter, superposed, whipped material in a continuously cool state.

2. In a device of the class described, a cover for a receptacle, an agitator suspended from said cover, means above said agitator to cause agitated material to rise in said receptacle about said means, and means on said cover for rotating said agitator and for causing a cooling medium to flow over the outside of said receptacle to cool the agitated material which has risen in said receptacle about said first mentioned means.

In testimony whereof we affix our signatures in the presence of two witnesses.

OTTO P. WERNER.
THEODORE W. ARNTZ.

Witnesses:
SYLVESTER N. BROWN,
W. H. DICK.